US007776215B2

(12) United States Patent
Abdalla et al.

(10) Patent No.: US 7,776,215 B2
(45) Date of Patent: Aug. 17, 2010

(54) FLOW CONTROL VALVE WITH PLATE SPRING FORCE ACTUATION

(75) Inventors: Wassem Abdalla, Cookeville, TN (US); Peter K. Herman, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 403 days.

(21) Appl. No.: 11/839,025

(22) Filed: Aug. 15, 2007

(65) Prior Publication Data
US 2009/0045109 A1 Feb. 19, 2009

(51) Int. Cl.
*B01D 35/153* (2006.01)
*B01D 24/38* (2006.01)
*B01D 35/02* (2006.01)
*B01D 27/00* (2006.01)
*B01D 35/00* (2006.01)

(52) U.S. Cl. ............... 210/235; 210/234; 210/418; 210/435; 210/437; 210/429; 210/430

(58) Field of Classification Search ............... None
See application file for complete search history.

(56) References Cited

U.S. PATENT DOCUMENTS

| 6,171,491 | B1 | 1/2001 | Popoff et al. | |
| 6,495,042 | B1 * | 12/2002 | Knight | 210/497.01 |
| 6,811,694 | B2 * | 11/2004 | Jainek | 210/248 |
| 7,238,285 | B2 | 7/2007 | Hacker et al. | |
| 2002/0139735 | A1 | 10/2002 | Stenersen et al. | |
| 2006/0118476 | A1 * | 6/2006 | Weindorf et al. | 210/234 |
| 2009/0184045 | A1 * | 7/2009 | Stamey et al. | 210/235 |

FOREIGN PATENT DOCUMENTS

| JP | 11-226314 A | 8/1999 |
| JP | 2004-245138 A | 9/2004 |

OTHER PUBLICATIONS

International Search Report of PCT/US2008/064691, dated Sep. 25, 2008.
Written Opinion of the International Searching Authority of PCT/US2008/064691, dated Sep. 25, 2008.

* cited by examiner

*Primary Examiner*—Duane Smith
*Assistant Examiner*—Banjamin Kurtz
(74) *Attorney, Agent, or Firm*—Hamre, Schumann, Mueller & Larson, P.C.

(57) ABSTRACT

A filter cartridge with a valve actuating protrusion having a sliding surface that is configured to engage with a valve, with the sliding surface being tapered so that a first portion of the sliding surface that engages the valve is wider than a second portion of the sliding surface that engages the valve, and the sliding surface is configured so that the first portion engages the valve before the second portion. The valve, which can be in any fluid passage of a filter housing, includes a plurality of spring arms. Engagement between the spring arms and the sliding surface creates a lifting force which opens the valve.

17 Claims, 5 Drawing Sheets

FLOW CONTROL VALVE WITH PLATE SPRING FORCE ACTUATION

FIELD

This disclosure generally pertains to the field of filtration, and more particularly to filtration systems providing mechanisms which help ensure that the filter that is used meets manufacturer specifications and requirements and prevents inferior, non recommended filters being used on the engine.

BACKGROUND

Many engine manufacturers recommend specific filters to be used with each of their engines for filtering fluids used in the engines. Problems occur, however, when filters are periodically replaced. Often, a filter is replaced with an inferior, non-recommended filter. In response, some filtration systems, for example fuel filtration systems, have been designed that require use of a specific filter design. In the case of fuel filtration systems, these "no filter, no run" filtration systems not only require that a filter be present, but the correct filter design must be used, in order to allow fuel to flow to the engine.

SUMMARY

A filtration system is described that helps prevent use of non-recommended and/or inferior filter cartridges in filtration systems. The filtration system can be designed for use in filtering fluids used in engines, for example fuel, lubrication, hydraulic, and air, as well as in other applications requiring fluid filtration. In the case of fuel filtration in an engine, engine operation can be prevented if the incorrect filter cartridge is installed or if the filter cartridge is missing entirely.

In one embodiment, a filter cartridge includes a filter media, and a valve actuating protrusion is connected to the filter media and positioned to actuate a valve of a filter housing with which the cartridge is intended to be used. The valve actuating protrusion has a sliding surface that is configured to engage with the valve, with the sliding surface being tapered so that a first portion of the sliding surface that engages the valve is wider than a second portion of the sliding surface that engages the valve, and the sliding surface is configured so that the first portion engages the valve before the second portion.

The valve actuating protrusion is shaped so that the sliding surface decreases in width in a direction opposite the installation direction of the cartridge. This shape, coupled with a spring force from spring arms on the valve, create horizontal and vertical forces on the spring arms, with the vertical forces causing the valve to be lifted upward, opposite the direction of installation of the filter cartridge, from a closed position to an open position.

The filter cartridge is designed to be connected to a filter housing that includes a fluid passage, and a valve controls fluid flow in the fluid passage. The valve includes a plug having a plurality of spring arms that extend toward a central axis of the plug. Each spring arm has an engagement portion facing toward the central axis, with the engagement portions defining an imaginary opening having a maximum width. A retainer is provided that retains the plug in the fluid passage, with the retainer having an opening therein that is coaxial to the central axis. The retainer opening has a maximum width that is greater than the maximum width of the opening defined by the engagement portions. The valve actuating protrusion can extend through the retainer opening and into engagement with the springs arms, forcing the spring arms apart until the engagement portions engage the sliding surface.

The valve actuating protrusion can be connected to any portion of the filter cartridge deemed suitable for engaging the valve. Likewise, the valve could be mounted in any fluid passage of a filter housing.

DETAILED DESCRIPTION

Figure 1:
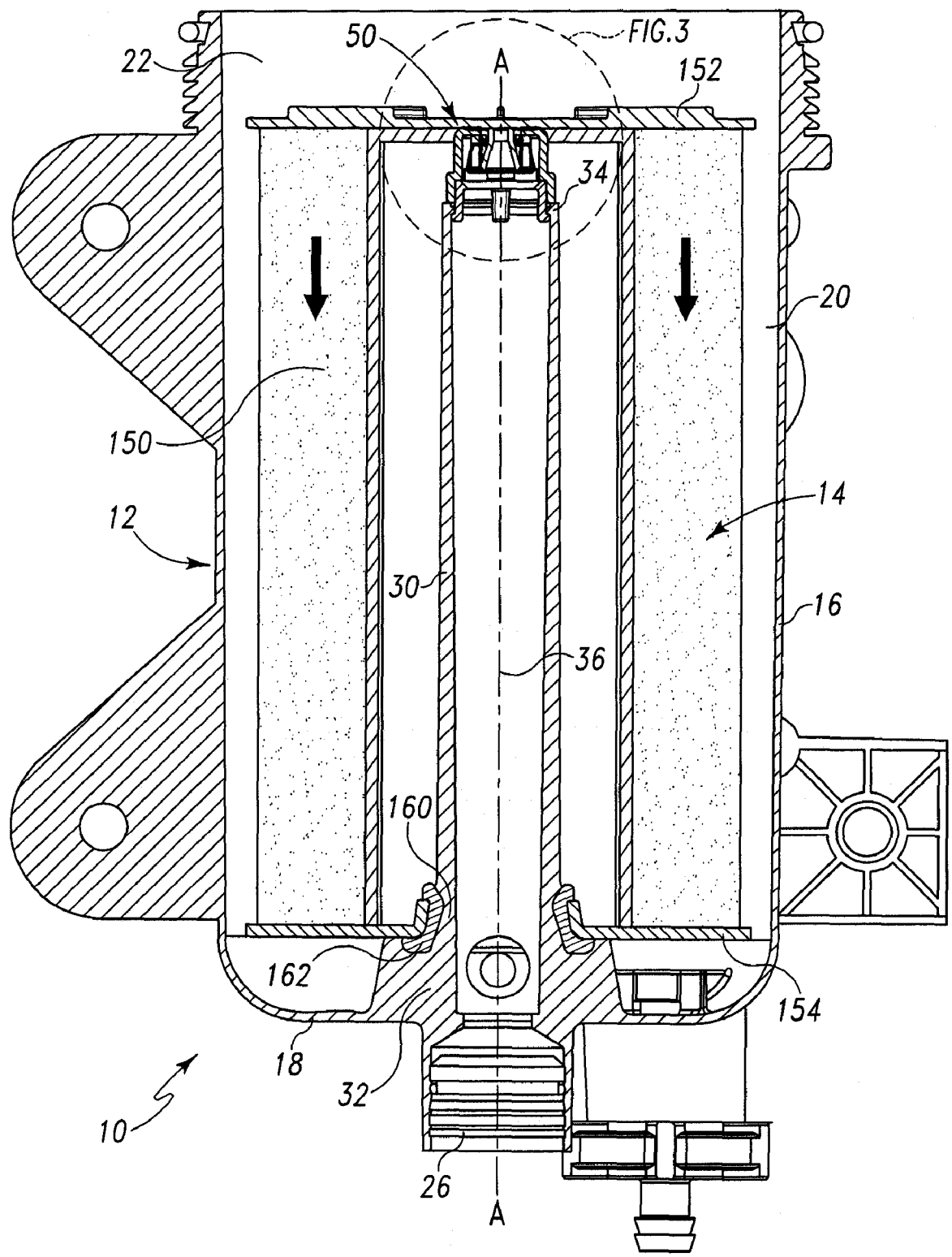
FIG. 1 is a sectional view of a filter assembly that includes a filter cartridge in a filter housing.

FIG. 1 illustrates a filter assembly 10, for example a fuel filter assembly, which is intended to filter a fluid, for example fuel, before the fluid reaches a protected system, for example a fuel injection pump and fuel injectors. The assembly 10 includes a filter housing 12 that is designed to receive a filter cartridge 14 therein for filtering the fluid. The description will hereinafter refer to the filter assembly 10 as being a fuel filter assembly and the fluid being filtered as fuel. However, in appropriate circumstances, one or more of the concepts described herein can be applied to other types of filter assemblies that filter other types of fluids, for example lubrication, hydraulic and other liquids, as well as air.

The filter housing 12 includes a housing body that has a side wall 16 and an end wall 18. The side wall 16 and the end wall 18 define a filter cartridge space 20 that is large enough to receive the filter cartridge 14 therein, with the end wall 18 forming a closed end of the space 20. The housing body has an open end 22 generally opposite the end wall 18, with the open end in use being closed by a lid (not shown) that closes off the space 20. The housing body also includes an inlet opening (not shown), that can extend, for example, through the side wall 16, and through which fuel to be filtered enters the space 20, and an outlet 26, illustrated as extending from the end wall 18, through which fuel exits. It is to be realized that the filter housing 12 could have other configurations than that described herein.

A standpipe 30 is secured to the end wall 18 and extends upwardly into the space 20 toward the open end 22. In the illustrated embodiment, the standpipe 30 is generally hollow from its end 32 connected to the end wall 18 to a tip end 34 thereof, thereby defining an internal flow passage 36. The flow passage 36 is in communication with the outlet 26 so that fuel that enters the standpipe 30 can flow from the standpipe and into the outlet 26 and ultimately to downstream protected systems. The standpipe 30 is disposed generally centrally in the housing 12, with a central axis A-A of the standpipe 30 generally coaxial with a central axis of the space 20.

Figure 2:
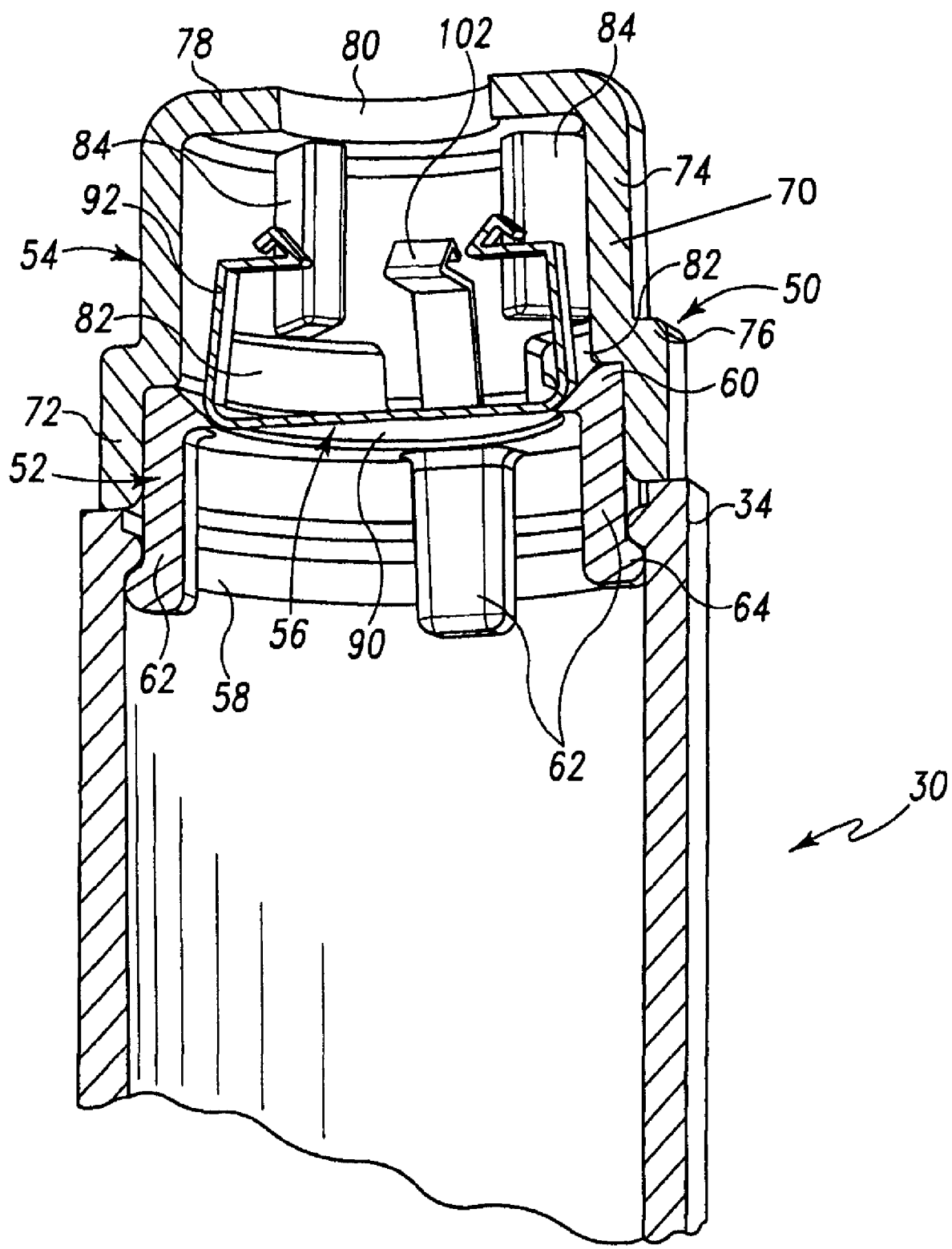
FIG. 2 is a perspective, sectional view of a flow control valve in an upper portion of a standpipe, with the valve in a closed position.

With reference to FIGS. 1 and 2, a flow restriction valve 50 is disposed at the tip end 34 of the standpipe 30 to control the flow of fuel into the standpipe 30 and thus to the outlet 26. In one embodiment described herein, when the valve is closed, the valve 50 prevents all flow of fuel into the standpipe 30 when no filter cartridge is installed or when an improper filter cartridge is installed. When the filter cartridge 14 or other appropriately designed filter cartridge is installed, the filter cartridge is designed to actuate the valve to an open position to permit maximum fuel flow into the standpipe.

In alternative embodiments, when the valve is closed, the valve is designed to allow limited flow of fuel into the standpipe 30 when no filter cartridge is installed or when an improper filter cartridge is installed. This limited flow allows lubrication of downstream components, such as a fuel pump, but is insufficient to allow the engine to operate.

The tip end 34 of the standpipe 30 is open, and the valve 50 is suitably secured at the open tip end as shown in FIGS. 1 and 2. The valve 50 includes a seat member 52, a retainer 54, and a plug 56.

A circumferential ridge 58 is formed on the inside surface of the standpipe 30 adjacent the tip end 34. The seat member 52 includes a ring 60, and a plurality of spaced legs 62, for example four, extend downwardly from the ring 60. The ends of the legs opposite the ring 60 each include a ridge 64 facing outward that form a snap fit connection with the ridge 58 to retain the seat member 52 on the standpipe with the ring 60 spaced slightly above the tip end 34. The seat member 52 can be secured in place on the standpipe in any suitable manner, for example by the snap fit connection, by being bonded to the standpipe such as with an adhesive or by thermal bonding, etc.

Figure 3:
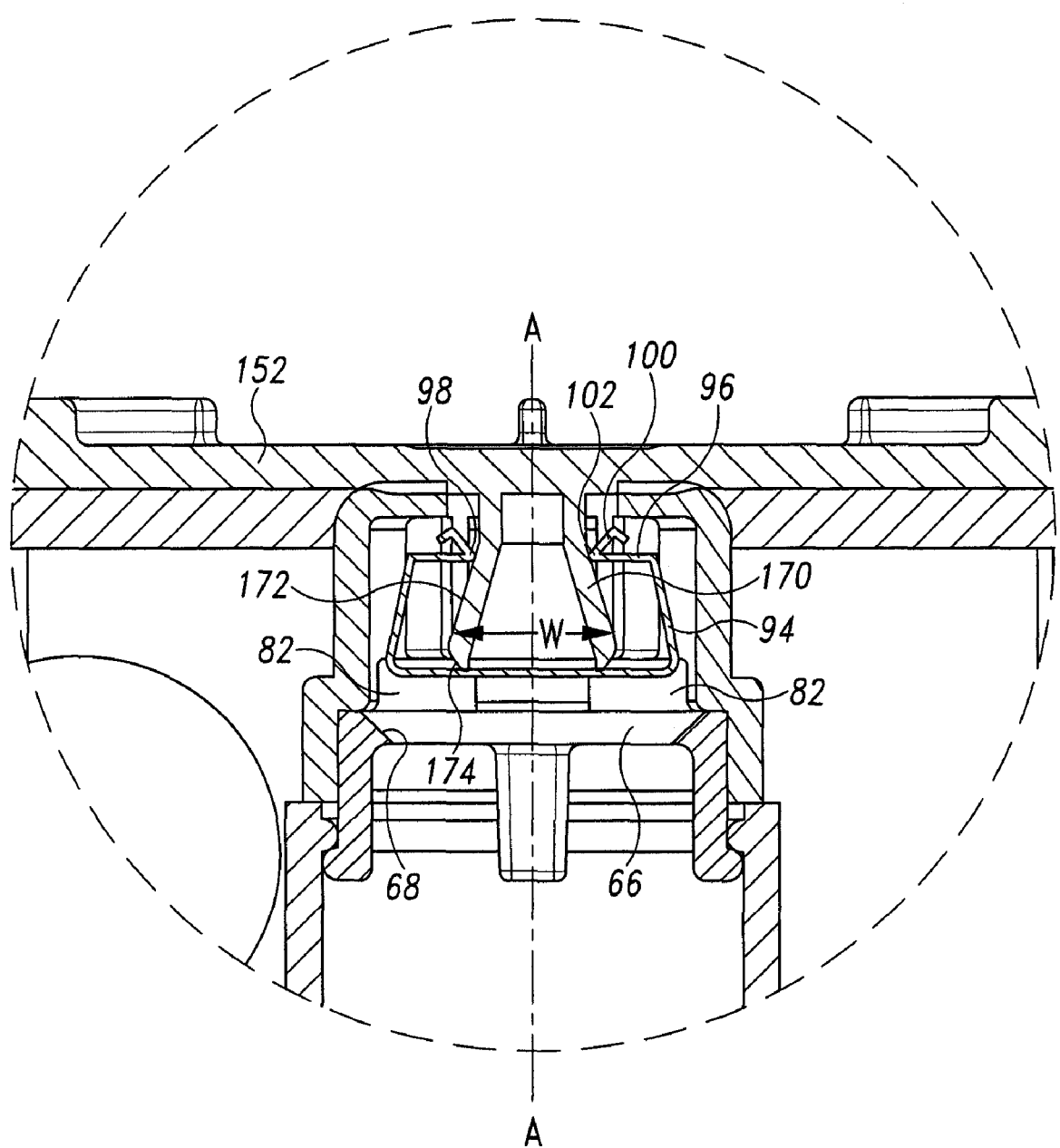
FIG. 3 is a detailed view of portion 3 in FIG. 1 with the flow control valve in an open position.

With reference to FIGS. 2 and 3, the ring 60 includes a central opening 66 through which fuel is to flow. Surrounding the opening 66 is a sloped surface 68 upon which the plug 56 seats when the plug is at a closed position, as shown in FIG. 2. The sloped surface 68 also helps guide the plug 56 back to the closed position after the plug has been lifted upwardly.

The retainer 54 comprises a sleeve 70 with a first cylindrical section 72 having a bottom that sits on the tip end 34. The retainer 54 can be secured in place on the standpipe in any suitable manner, for example by a snap fit connection, by being bonded to the standpipe such as with an adhesive or by thermal bonding, etc. The inner surface of the section 72 fits closely with the outer facing surfaces of the legs 62. The sleeve 70 also includes a second cylindrical section 74 having a diameter less than the diameter of the section 72, thereby creating a shoulder 76 between the sections 72, 74. A top wall 78 is at the upper end of the section 74 and a hole 80 is formed through the wall 78 to allow communication between the exterior of the retainer 54 and the interior of the retainer.

In addition, one or more fluid flow holes 82 are formed through the section 74 adjacent the shoulder 76 and the juncture with the section 72. In the illustrated embodiment, four holes 82 are provided, although a smaller or larger number of holes can be provided. Further, a plurality of projections 84 are formed on the inner surface of the section 74 above the holes 82 and extending upwardly to the wall 78. The projections 84 are intended to engage the plug 56 during removal of the filter cartridge to cause the plug 56 to be removed from the valve actuating protrusion. Therefore, the projections 84 extend inwardly a sufficient distance to engage the plug during cartridge removal. In the illustrated embodiment, four projections 84 are used, one above each hole 82, although a smaller or larger number of projections could be used.

As shown in FIGS. 2 and 3, the retainer 54 engages with the seat member 52 so that the inner surface of the section 72 fits closely with the outer facing surfaces of the legs 62, the bottom end of the retainer 54 sits on the tip end 34, and the shoulder 76 area is on top of the ring 60.

It is contemplated that the seat member 52 could be optional. Instead, the sloped surface 68 could be formed on the end 34 of the standpipe, and the plug 56 would seat directly onto the standpipe.

The plug 56 comprises a plate portion 90 having a shape that corresponds to the shape of the opening 66. For example, the opening 66 and the plate portion 90 can be circular, although other shapes are possible. The plate portion 90 has a diameter that is slightly greater than the diameter of the opening 66 so that the plate portion 90 can seat on the sloped surface 68 in a closed position. In the illustrated embodiment, the plate portion 90 is substantially solid and, when seated on the sloped surface 68, substantially prevents any fuel flow through the opening 66. In other embodiments, the plate portion 90 and/or sloped surface 68 can be designed to permit limited fuel flow through the opening 66 when the plate portion 90 is seated on the sloped surface 68. For example, limited fuel flow can be permitted by openings formed through the plate portion 90, slots or channels formed the plate portion 90 and/or the sloped surface 68, or loose tolerances can be provided between the plate portion and the sloped surface to allow fluid past, etc.

Extending upwardly from the plate portion 90 are a plurality of spring arms 92, For example, four arms 92 are illustrated although a larger or smaller number could be used. In the illustrated embodiment the spring arms 92 are integrally formed with the plate portion 90, although the spring arms 92 could be separately formed and attached to the plate portion. The plate portion 90 and arms 92 are formed from a material suitable for exposure to fuel or other fluid being filtered, for example metal or plastic. Each of the arms 92 is disposed between two adjacent projections 84.

The spring arms 92 are designed to engage with an angled or tapered surface on the valve actuating protrusion and thereby lift the plate portion 90 upward from the sloped surface to open the valve and allow maximum flow through the opening 66. With reference to FIG. 3, each spring arm 92 includes an angled section 94 that connects to the plate portion 90 and extends upwardly at an oblique angle relative to the axis A-A. A generally horizontal section 96 extends from the upper end of the angled section 94 inwardly toward the axis A-A to a tip end 98 defining an engagement portion, and a hook section 100 extends from the tip end 98 back over a portion of the section 96. The hook sections 100 form downwardly sloped guide surfaces 102 that guide the valve actuating protrusion upon installation of the filter cartridge.

Turning now to the filter cartridge 14, the cartridge includes a ring of filter media 150 suitable for filtering fuel, an upper end plate 152 secured to an upper end of the media 150, and a lower end plate 154 secured to a bottom end of the media 150. The end plates 152, 154 are formed of a suitable material, for example plastic.

The inside of the ring of media 150 defines a clean or filtered fuel side of the filter cartridge 14 and the outside of the media 150 defines a dirty or unfiltered fuel side, whereby the filter cartridge is configured for outside-in flow. In appropriate circumstances, the concepts described herein can be applied to inside-out type flow filter cartridges. In addition, it is to be realized that the concepts described herein can be utilized with other filter cartridge designs, such as with multi-stage filter cartridges.

The lower end plate 154 includes a standpipe opening 160 therein that allows the lower end plate 154 to fit over the standpipe 30 when the filter cartridge 14 is installed. A seal 162 is disposed in the opening 160 to seal with the outside surface of the standpipe to prevent fuel leaks.

With reference to FIG. 3, the upper end plate 152 includes a valve actuating protrusion 170 projecting downwardly from a bottom surface of the plate 152. The protrusion 170 is designed to engage with the spring arms 92 to lift the plug 56 upwardly to an open position to allow a maximum fuel flow rate through the opening 66.

The protrusion 170 is of a tapered construction that tapers in width w, as measured in a horizontal direction, toward the end plate 152 so that the protrusion decreases in width in a direction opposite the installation direction of the filter cartridge 14. In FIG. 3, the protrusion 170 is illustrated as being generally diamond shaped, with an outer, circumferentially continuous sliding surface 172 that decreases in width or tapers upwardly toward the end plate 152. The protrusion 170 is illustrated as being hollow which reduces the amount of material used. However, the protrusion 170 could be solid or partially hollow.

The maximum width w of the protrusion 170 is less than the width of the hole 80 to permit the protrusion 170 to travel through the hole 80 upon installation of the cartridge 14. In addition, the maximum width w of the protrusion 170 is greater than the width of the imaginary opening defined by the tip ends 98 of the spring arms 92.

Upon installation of the cartridge 14, the protrusion 170 extends through the hole 80 and reaches the spring arms 92. The protrusion 170 engages the guide surfaces 102 which causes the spring arms 92 to be pushed radially outward away from each other. This increases the size of the imaginary opening defined by the tip ends 98. The bottom end 174 of the protrusion 170 can be shaped to assist in achieving engagement between the protrusion and the guide surface 102. As illustrated in FIG. 3, the bottom end 174 is slightly conical.

The spring arms 92 are pushed open until the size of the imaginary opening of the tip ends 98 is slightly greater than the maximum width w, at which time the tip ends 98 start sliding on the sliding surface 172. Due to the spring force in the spring arms 92 and the angle of the sliding surface 172, vertical and horizontal force components are generated on the spring arms 92. The vertical force component causes the plate portion 90 of the plug 56 to be lifted upward off of the sloped surface 68 as the filter cartridge continues to be installed, thereby opening the valve. Once the valve is open, fuel can flow through the holes 82 and into the opening 66, through the flow passage 36 and to the outlet 26. Once in the fully open position, the tip ends 98 return to their original starting position, thereby unloading the spring arms 92 to avoid set being created in the spring arms 92.

Upon removal of the filter cartridge 14, the plug 56 is lifted upward with the cartridge. The bottoms of the projections 84 will engage the top surface of the plate portion 90, which will force the plug 56 off of the valve actuating protrusion 170 as the cartridge 14 is removed. The plug 56 will then drop back down onto the seat member 52 to the closed position.

Figure 4:
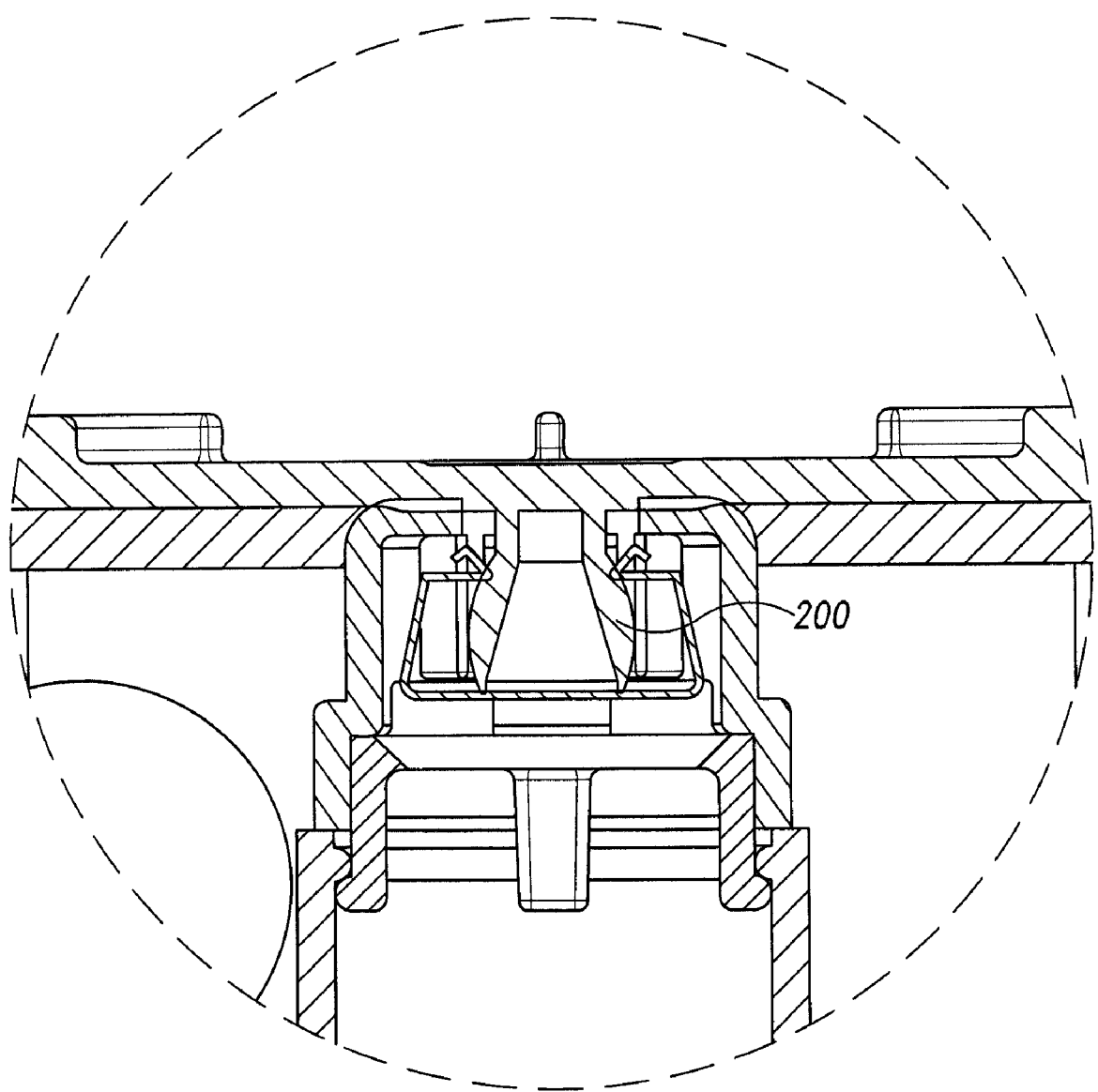
FIG. 4 is a detailed view similar to FIG. 3 of an alternative embodiment of a valve actuating protrusion on a filter cartridge.
Figure 5:
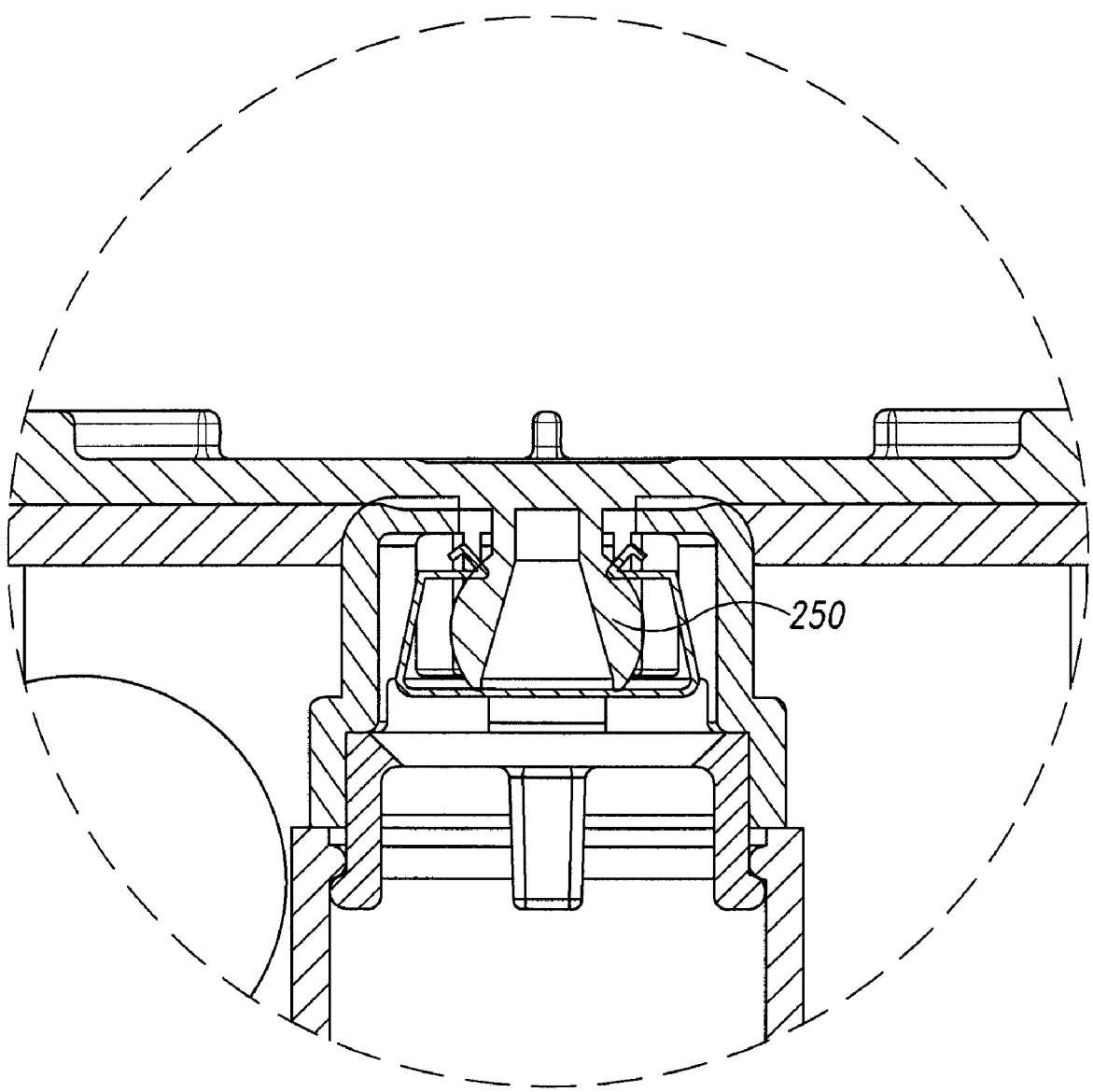
FIG. 5 is a detailed view similar to FIG. 3 of yet another alternative embodiment of a valve actuating protrusion on a filter cartridge.

Other configurations of the valve actuating protrusion are possible, as long as the protrusion is suitably configured to put the spring arms under load and create the upward lifting force on the valve plate. For example, FIG. 4 illustrates a valve actuating protrusion 200 that has a generally oval shape, while FIG. 5 illustrates a valve actuating protrusion 250 that has a generally round or spherical shape.

Further, the sliding surface 172 need not be circumferentially continuous. The sliding surface 172 could be circumferentially discontinuous creating sliding surface sections. This embodiment would be especially useful where a large number of spring arms are used that effectively create a generally continuous ring of spring arms to ensure engagement between the spring arms and the sliding surface sections without having to worry about proper alignment during installation, or where two or more wide spring arms are used which together effectively form the generally continuous ring. However, when it is considered acceptable to require alignment between spring arms and sliding surface sections during installation, the discontinuous sliding surface could be used with the illustrated and described plug 56 construction.

The valve actuating protrusion is illustrated as described as extending from the end plate. However, the protrusion could be mounted to other portions of the filter cartridge, for example the center tube or any other part of the filter cartridge suitable for engaging the valve. In addition, the valve need not be mounted on a standpipe. The valve could be mounted in any fuel passage of a filter housing. For example, the concepts described herein could be used with a filter housing without a standpipe having an opening near the base of the housing with a valve that is actuated open by a protrusion on the bottom end plate of the filter cartridge. In appropriate circumstances, the concepts described herein could also be used on bottom load or spin-on filtration designs where a filter cartridge is threaded onto a filter housing.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter cartridge, comprising:
   a filter media; and
   a valve actuating protrusion positioned to actuate a valve of a filter housing with which the cartridge is intended to be used, the valve actuating protrusion having a radially outward facing sliding surface that is configured to engage with the valve, the radially outward facing sliding surface being tapered so that a first portion of the radially outward facing sliding surface that engages the valve is wider than a second portion of the radially outward facing sliding surface that engages the valve, and the radially outward facing sliding surface is configured so that the first portion engages the valve before the second portion, further comprising an end plate connected to the filter media, wherein the end plate is an upper end plate, and the valve actuating protrusion extends downwardly from the upper end plate.

2. The filter cartridge of claim 1, wherein the valve actuating protrusion has a generally diamond shape, generally oval shape, or generally round shape.

3. The filter cartridge of claim 1, wherein the radially outward facing sliding surface is circumferentially continuous.

4. A filter cartridge, comprising:
   a filter media; and
   a valve actuating protrusion positioned to actuate a valve of a filter housing with which the cartridge is intended to be used, the filter cartridge having an installation direction relative to the filter housing; the valve actuating protrusion having a radially outward facing sliding surface that is configured for sliding engagement with at least a portion of the valve, and the radially outward facing sliding surface decreases in width in a direction opposite the installation direction, further comprising an end plate connected to the filter media, wherein the end plate is an upper end plate, and the valve actuating protrusion extends downwardly from the upper end plate.

5. The filter cartridge of claim 4, wherein the valve actuating protrusion has a generally diamond shape, generally oval shape, or generally round shape.

6. The filter cartridge of claim 4, wherein the radially outward facing sliding surface is circumferentially continuous.

7. A filter housing, comprising:
a fluid passage having a central axis; and
a valve controlling fluid flow in the fluid passage, the valve comprising a plug having a plate portion and a plurality of spring arms that extend toward the central axis, each spring arm having an engagement portion facing toward the central axis, the engagement portions defining an imaginary opening having a maximum width, and a retainer configured to retain the plug in the fluid passage, the retainer having an opening therein that is coaxial to the central axis, the retainer opening having a maximum width that is greater than the maximum width of the opening defined by the engagement portions; and
a sloped surface, and the plug seats on the sloped surface when in a closed position.

8. The filter housing of claim 7, wherein the valve further comprises a seat member, and the sloped surface is defined on the seat member.

9. The filter housing of claim 7, further comprising a standpipe that defines the fluid passage, and the valve is connected to the standpipe.

10. The filter housing of claim 7, further comprising a plurality of projections connected to the retainer and extending toward the central axis, each projection is disposed between a pair of adjacent ones of the spring arms.

11. An assembly, comprising:
a filter housing including:
a fluid passage; and
a valve controlling fluid flow in the fluid passage, the valve comprising a plug having a plurality of spring arms that extend toward a central axis of the plug, each spring arm having an engagement portion facing toward the central axis, the engagement portions defining an imaginary opening having a maximum width, and a retainer configured to retain the plug in the fluid passage, the retainer having an opening therein that is coaxial to the central axis, the retainer opening having a maximum width that is greater than the maximum width of the opening defined by the engagement portions; and
a filter cartridge connectable to the filter housing, the filter cartridge including:
a filter media; and
a valve actuating protrusion positioned to actuate the valve, the valve actuating protrusion having a radially outward facing sliding surface that is configured to engage with the engagement portions of the spring arms, the sliding surface being tapered so that a first portion of the radially outward facing sliding surface that engages the engagement portions is wider than a second portion of the radially outward facing sliding surface that engages the engagement portions, and the radially outward facing sliding surface is configured so that the first portion engages the engagement portions before the second portion.

12. The assembly of claim 11, wherein the valve actuating protrusion has a generally diamond shape, generally oval shape, or generally round shape.

13. The assembly of claim 11, further comprising an end plate connected to the filter media, and the valve actuating protrusion extends from the end plate.

14. The assembly of claim 13, wherein the end plate is an upper end plate, and the valve actuating protrusion extends downwardly from the upper end plate.

15. The assembly of claim 11, wherein the valve further comprises a sloped surface, and the plug seats on the sloped surface when in a closed position.

16. The assembly of claim 11, further comprising a standpipe in the filter housing that defines the fluid passage, and the valve is connected to the standpipe.

17. The assembly of claim 11, further comprising a plurality of projections connected to the retainer and extending toward the central axis, each projection is disposed between a pair of adjacent ones of the spring arms.

* * * * *